(No Model.)

D. J. RUMBAUGH & J. S. BRANDT.
CAR COUPLING.

No. 273,896. Patented Mar. 13, 1883.

Witnesses:
P. B. Turpin
J. N. Griffin

Inventor
David J. Rumbaugh
Jacob S. Brandt
By R. S. & A. H. Lacey, Att'ys

UNITED STATES PATENT OFFICE.

DAVID J. RUMBAUGH AND JACOB S. BRANDT, OF CRIDERSVILLE, OHIO.

CAR-COUPLING.

SPECIFICATION forming part of Letters Patent No. 273,896, dated March 13, 1883.

Application filed November 17, 1882. (No model.)

*To all whom it may concern:*

Be it known that we, DAVID J. RUMBAUGH and JACOB S. BRANDT, citizens of the United States, residing at Cridersville, in the county of Auglaize and State of Ohio, have invented certain new and useful Improvements in Car-Couplings; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has reference to improvements in car-couplings; and it consists in the construction, combination, and arrangement of the several parts, as will be hereinafter fully described, and particularly pointed out in the claim.

Figure 1:
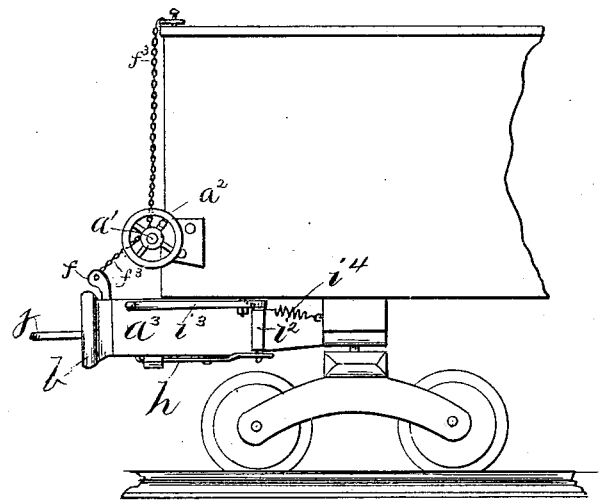
Figure 2:
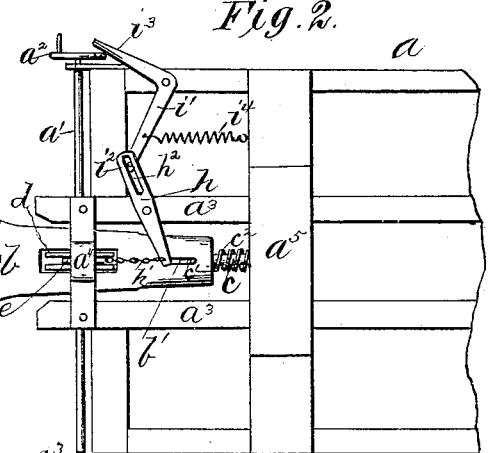
Figure 3:
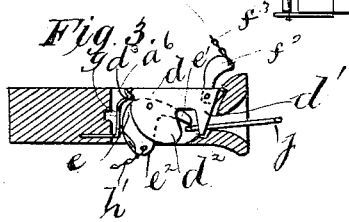
Figure 4:
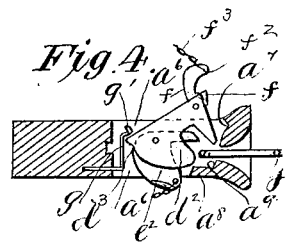

In the drawings, Figure 1 is a side, and Fig. 2 is an inverted plan, view of a car having our improved coupler attached thereto, and Figs. 3 and 4 are sectional views of the draw-head, as will be described.

$a$ is the car.

$a'$ is a shaft journaled on front of car and adapted to serve as a windlass to wind the chain which raises the hook, hereinafter described. The shaft is provided on one end with a crank-wheel, $a^2$. Where desired, a crank-wheel may be secured on both ends of the shaft.

$b$ is the draw-head, secured between the beams $a^3$ on the bottom of the car by a strap, $a^4$, extended from one to the other of the beams $a^3$ and under the draw-head, as shown. The draw-head is provided, near its rear end, with a vertical slot, $b'$, which opens through the mortise bored in the rear end of the draw-head to receive the draw-bar, hereinafter described.

$c$ is the draw-bar, secured to beam $a^5$ and extended within the mortise formed in the rear end of the draw-head, and connected with the draw-head by pin $c'$, passed through the slot $b'$, as shown in Fig. 2.

$c^2$ is a coil-spring placed on draw-bar $c$ and bearing between the beam $a^5$ and the rear end of the draw-head, providing a yielding support to the said draw-head.

$a^6$ is a vertical mortise extending entirely through the draw-head, near its forward end, providing space for the coupling mechanism. This mortise is extended at its forward upper end to provide the recess $a^7$, into which fits the point of the locking-latch, and the mortise is made shorter at its lower than in its upper side, so as to provide the ledge $a^8$, against which the point of the hook rests, in rear of the square shoulder $a^9$.

$d$ is the coupling-bar, pivoted near its rear end within the mortise $a^6$ and bifurcated at its rear end. This bar is constructed with the hook $d'$ on its forward end, and with the wing $d^2$. The wing $d^2$ is arranged in rear of the hook $d'$, and in position to receive the stroke of the link when inserted in the operation of coupling.

$d^3$ is a notch formed in the rear of the bar $d$ to receive the point of the spring, hereinafter described.

$e$ is the link-elevating trip, pivoted on the same pin with the bar $d$, and between the arms of the bifurcated rear end thereof. This trip is formed with the arm $e'$, which extends to and works within the space between the hook $d'$ and wing $d^2$, in position to bear on the end of the link in the operation of the device. The arm $e^2$ of the trip extends below the wing $d^2$.

$f$ is a latch pivoted on the upper forward end of the bar $d$, and having the point $f'$, adapted to extended within the recess $a^7$ when the bar $d$ is down in the draw-head and hold the said bar from rising. The arm $f^2$ of this latch is made larger than the point $f'$ and sufficiently heavy to automatically fall forward and carry the point $f'$ into the recess $a^7$ in the operation of the device.

$f^3$ is the chain or cord for raising the bar $d$. It is secured to the arm $f^2$ of latch $f$ and is wound around shaft $a'$, and thence extends to top of car, as shown, so that the cars may be uncoupled while in motion, if it is so desired.

$g$ is a spring-bar having one end made fast to the rear wall of the mortise $a^6$ and its opposite end arranged to bear against the rear end of bar $d$, and bent to form the projection $g'$, adapted to enter the notch $d^3$, or rest on top of the bar, thus holding the bar down in the position shown in Fig. 3, or up, as shown in Fig. 4, in the operation of coupling.

$h$ is a lever pivoted on one of the beams $a^3$, and having one end extended under the draw-head and connected with the trip $e$ by the chain $h'$, and having its other end constructed with a slot, $h^2$.

$i$ is a lever pivoted to the under side of the car, and having its arm $i'$ provided on its outer end with a pin, $i^2$, which is projected through the slot $h^2$, as shown. The handle-arm $i^3$ extends within reach from the side of the car. $i^4$ is a coil-spring connected to the beam $a^5$ and the arm $i'$ of the lever $i$, as shown. $j$ is the link.

In the operation of our invention, when the bar $d$ is in the position shown in Fig. 4 it is held by the spring $g$ bearing on top of its rear end. The link $j$ being forced into the draw-head opening strikes the wing $d^2$ of bar $d$ and drives it back and the several parts fall into the position shown in Fig. 3, with the hook $d'$ holding the link, the latch $f$ extending within the recess $a^7$, and the spring $g$ bearing in the notch $d^3$. The car is now ready for coupling to another. In case the draw-head of the car to be coupled is higher, the link may be elevated by drawing on handle $i^3$, which, by connections described, forces point of arm $e$ down on end of link, raising the outer end of same as desired.

When it is desired to uncouple, the chain $f^3$ is drawn on. This chain, being connected to latch $f$, releases the same from its lock with the draw-head before it raises the bar $d$, as will be clearly understood from the drawings.

Having thus described our invention, what we claim, and desire to secure by Letters Patent, is—

In combination, in a car-coupler, the draw-head, the hook-bar, the latch pivoted on the hook-bar and arranged to engage a stop formed in the draw-head, the trip pivoted and having one arm arranged to elevate the link and its other arm projected downward, the pivoted arm $h$, connected with the trip and provided with slot $h^2$, and lever $i$, pivoted below the car, and having its arm $i'$, provided with pin $i^2$, projected within slot $h^2$, and its handle-bar arranged within reach of the operator, substantially as described.

In testimony whereof we affix our signatures in presence of two witnesses.

DAVID J. RUMBAUGH.
JACOB S. BRANDT.

Witnesses:
B. G. STUMP,
J. W. PIXLEY.